March 15, 1966  W. H. VAN MARTER  3,240,118
DUAL SLIDE PROJECTOR APPARATUS FOR PRODUCING TRANSITION EFFECTS
Filed Nov. 21, 1962  3 Sheets-Sheet 1
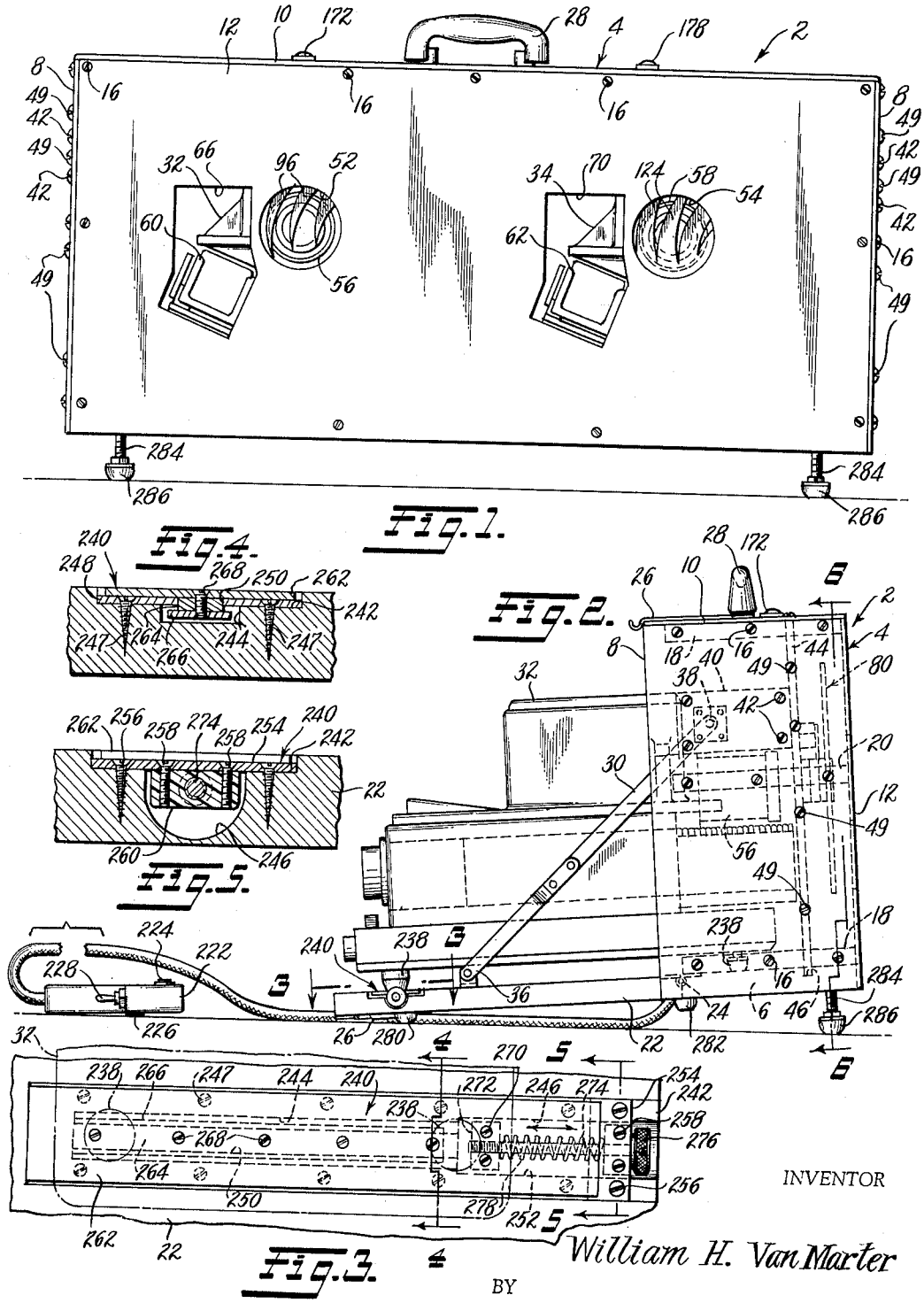
INVENTOR
*William H. Van Marter*
BY
*Bacon & Thomas* ATTORNEYS March 15, 1966 W. H. VAN MARTER 3,240,118
DUAL SLIDE PROJECTOR APPARATUS FOR PRODUCING TRANSITION EFFECTS
Filed Nov. 21, 1962 3 Sheets-Sheet 2

INVENTOR
William H. VanMarter

BY Bacon & Thomas

ATTORNEYS

United States Patent Office 3,240,118
Patented Mar. 15, 1966

3,240,118
DUAL SLIDE PROJECTOR APPARATUS FOR PRODUCING TRANSITION EFFECTS
William H. Van Marter, % Mrs. Louis Bose, 290 Magazine Ave., New Braunfels, Tex.
Filed Nov. 21, 1962, Ser. No. 239,303
9 Claims. (Cl. 88—28)

This invention relates generally to an apparatus for projecting transparencies and the like, and more particularly to a portable, semi-automatic, remotely controllable projection apparatus utilizing two transparency projection machines capable of presenting a series of transparencies in sequence with a smooth brightness transition therebetween and of producing overlay effects wherein the image of one transparency is actually or apparently superimposed on a screen over the image of another transparency.

The use of projected still transparencies, or slides as they are more commonly denoted, for illustrating matter presented during educational and training lectures and the like has become quite prevalent. Often a series of slides are to be presented in rapid sequence with more or less gradual transition from one to the other rather than an abrupt change, or it is desired to overlay or superimpose the image of one slide over that of another whereby to illustrate progressive changes in or emphasize certain portions of the projected subject matter. The use of two conventional slide projectors to accomplish these effects has been proposed, but certain inherent difficulties have until this invention rendered the results obtained therefrom less than is desirable.

The use of overlay techniques for illustrating progressive changes in a basic structure has recently received considerable attention. There are two basic types of overlays, real and virtual; in the former a slide containing the basic image is projected and remains on the screen, and a series of subsequent slides containing the additional material are projected one at a time over the first image in registry therewith. Virtual overlays create the illusion that a complete image is built up piece by piece from what appears to be a series of added overlays. In actuality, virtual overlays are created by projecting a first slide, and then replacing the first slide with a second slide with both being visible together on the screen for a short, overlapping time; this technique is continued until the complete image is attained, and offers an added advantage in that parts of the basic image may be deleted while simultaneously adding other elements thereto.

While the use of two slide projectors to obtain these overlay effects is known, a problem has existed which often causes annoyance to or distracts a viewer from the subject matter being presented. In both of the hereinabove described overlay techniques two slides are projected on the same screen during at least a portion of the viewing time. The resultant sudden variations in brightness occurring when the change is made between one and two projected images, and the different levels of brilliance associated with the various numbers of projected images on the screen, are the source of these viewer annoyances. Thus, there has been a need for an apparatus whereby the change over between slides is accomplished by smoothly decreasing the brightness of the first image while correspondingly smoothly increasing the brightness of the second image; by properly controlling the brightness of the two images it is possible to maintain a uniform screen brightness throughout the viewing time period, thus eliminating the occurrence of distracting brilliance variations.

Various proposals have been made for varying image brightness, the majority revolving around modifications incorporated into the projector mechanism. While many of these proposals have proved satisfactory where but a single projector is utilized, the difficulty inherent in simultaneously operating two such modified projectors to obtain smooth transition between two slides having overlapping viewing periods has limited their use therefor. The apparatus of the instant invention utilizes two slide projectors, and is so constructed that the image emanating from one projector is uniformly decreased from maximum brightness to out while the image of the next slide in the second projector is simultaneously increased at the same uniform rate from out to full brightness. Thus, the brightness of the viewed image remains substantially constant, and overlay techniques may be employed without the occurrence of distracting brillance variations.

The apparatus of the present invention is constructed for use with any two conventional projection machines, the brightness varying structure being completely independent of the projectors utilized. The economies and flexibility realizable from this feature are readily apparent. Moreover, the apparatus of the instant invention is especially constructed to eliminate another problem inherent in the use of two projectors to obtain overlay effects; that of proper registry between the images projected by the two machines.

The effectiveness of any overlay technique is largely determined by the accuracy with which subsequent images register with the first image. While the two projectors may be readily manipulated to bring their respective images into fairly close registry, it usually is difficult to obtain perfect registry because of the magnified effect on a distant screen of a small change in projector position. The present invention includes an easily manipulated, finely adjustable mechanism for precisely moving one projector relative to the other to obtain proper registry.

Another desirable feature for projection apparatus is that it be capable of being remotely controlled, this being especially desirable where a lecturer also desires to operate the apparatus. The apparatus of the present invention is constructed for remote operation, and is fully compatible with those commercially available projectors which are fitted with automatic slide changing apparatus.

It is, therefore, an object of this invention to provide a projection apparatus capable of projecting a series of film transparencies in sequence upon a screen with uniform intensity of reflected light throughout the viewing period.

Another object of the present invention is to provide a projection apparatus incorporating two conventional projection machines, and so constructed as to project a series of film transparencies upon a single screen in alternation from said projection machines with a uniform light brightness throughout the viewing period.

A further object of this invention is to provide a projection apparatus incorporating a plurality of conventional projection machines, and so constructed as to project a series of film transparencies upon a screen in superimposed, overlying relationship with a substantially uniform light brightness throughout the viewing period.

It is also an object of the subject invention to provide a projection apparatus for projecting film transparencies wherein the brightness of the projected image may be varied according to a predetermined relationship between out and full brightness.

Another object of the present invention is to provide a projection apparatus capable of automatic operation, and so constructed that the brightness of the projected image is automatically varied from out to full brightness and return, and that transparencies are automatically changed during the period of no brightness.

A still further object of this invention is to provide a projection apparatus of the type described which is capable of being remotely controlled.

It is also another object of the present invention to provide a projection apparatus incorporating two projectors and having means for precisely adjusting the registration upon a screen of the individual projected images of said projectors.

An even further object of this invnetion is to provide a projection apparatus of the type described capable of being utilized with conventional transparency projection machines.

A still further object of the invention is to provide a novel apparatus for projecting an image and an overlay onto a screen and changing the image or overlay with no apparent change in total brightness on the screen.

Other objects and many of the attendant advantages of the invention will be readily appreciated as the same becomes better understood by reference to the following detailed description when considered in connection with the accompanying drawings, wherein;

FIG. 1 is a front elevation of the projection apparatus of the present invention in its operative position, a pair of conventional projectors being mounted thereon;

FIG. 2 is a view in side elevation of the apparatus of FIG. 1, showing in particular the manner in which a conventional projection machine is disposed thereon;

FIG. 3 is a plan view, taken generally along line 3—3 in FIG. 2, of the image registry adjustment device;

FIG. 4 is a transverse section, taken on line 4—4 in FIG. 3, showing in detail the construction of the image registry adjustment device;

FIG. 5 is a detail cross section taken at 5—5 in FIG. 3, and further shows the constructiion of the image registry adjustment device;

Figure 6:
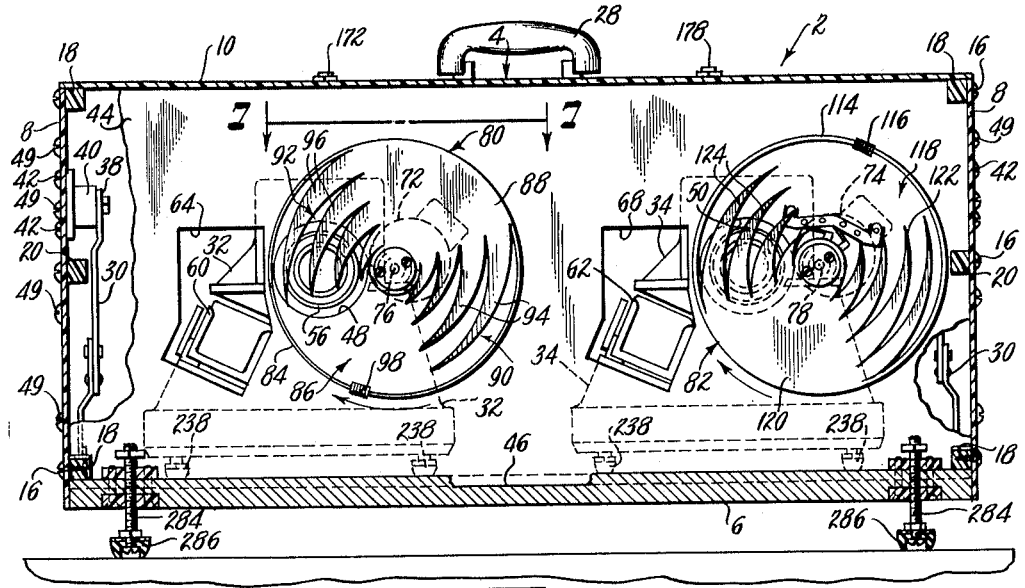
FIG. 6 is a section taken on line 6—6 in FIG. 2, and shows in elevation the image brightness controlling apparatus of the invention.
Figure 7:
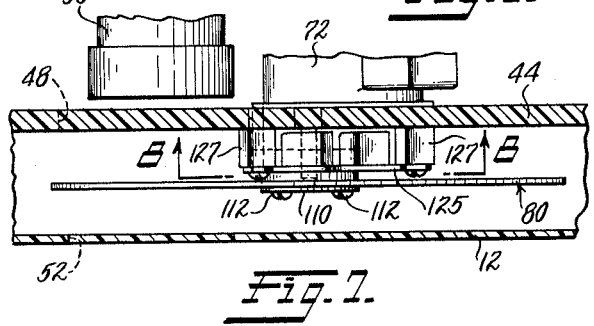
FIG. 7 is a section, taken at 7—7 in FIG. 6, showing in plan view the manner in which one of the masks is mounted.

The projection apparatus of the present invention is intended for use with two still projection machines, preferably of the conventional type incorporating slide magazines and automatic, remotely controllable slide changing equipment.

The apparatus includes a portable case having a back panel which folds outwardly to form a supporting base for the two projectors, a finely adjustable means being mounted on said back panel for shifting one of said projectors relative to the other to bring their respective images into registry upon a common screen or other display surface. The front panel of the case is provided with openings through which the lens system of the two projectors are aimed, and mounted in the case to cooperate with said openings are two identical sets of apparatus, one for each projector, for varying the brightness of the projected image in a precisely determined manner.

Each image brightness varying device incorporates a mask or disc of opaque material which is mounted to confront one of said openings, and which is positioned just forwardly of the objective lens of one of the projectors and sufficiently out of the focal plane of the projector's lens system that no shadows are cast on the display screen. Each disc is divided into four quadrants, one of which is open and two of which (the two quadrants on either side of the open quadrant) are configured to gradually mask and unmask the projected image when the disc is rotated. The fourth quadrant is opaque, and functions to completely block the projected image emanating from its associated projector.

Each disc is mounted centrally, for rotation, upon the shaft of a drive motor, which motor is preferably of the synchronous type equipped with an integral magnetic brake and clutch assembly. Additionally, a pair of cams are mounted upon each motor shaft, and cooperate with a pair of switches to provide automatic sequencing of the projector apparatus and, if the slide projector is of the proper type, automatic slide changing. A remote control unit is connected with the apparatus, and permits it to be operated at a distance therefrom.

Referring now to the embodiment of the invention illustrated in the drawings, the projection apparatus of the invention is indicated generally at 2, and includes a rectangular case 4 comprising a base 6, a pair of side panels 8, a top panel 10, and a front panel 12. The base 6 and the panels 8, 10 and 12 may be constructed of any suitable material, such as compressed wood product, and are secured together by screws 16 which pass therethrough and are anchored in rectangular corner and side frame bracing members 18 and 20, respectively.

A relatively thick back panel 22 is attached to the bottom panel 6 of the case 4 by a piano or other suitable type hinge 24, which hinge is disposed to lie flush on the upper surface of said panels when the back panel is opened in FIG. 2. The bottom panel 6 has a width that is less than that of the side panels 8 and 10 by an amount substantially equal to the thickness of said back panel, whereby to define a recess for receiving said back panel when it is in its closed position, and the components 26 of a suitable latch are secured to the back and top panels whereby to secure the former in its closed position. For convenience in carrying the apparatus, a suitable handle 28 is secured to the top panel 10.

The back panel 22 is releasably locked in its down or unfolded position (FIG. 2) by a pair of conventional folding braces 30. The braces 30 are of the type which are substantially rigid when extended, and lock the panel 22 so that together with bottom panel 6 it defines a flat surface for supporting a pair of conventional transparency or slide projection machines 32 and 34; one end 36 of each brace is pivotally attached to the panel 22, and the other end 38 of each brace is pivoted to an anchor plate 40 which is itself secured to its associated side panel 8 by screws 42 (FIG. 6).

The case 4 has a mounting panel 44 therein spaced from and parallel to the front panel 12, the bottom edge of said panel being received in a groove 46 in the base panel 6 (FIGS. 2 and 6). The mounting panel is secured to the side and top panels 8 and 10 by screws 49, and has a pair of circular openings 48 and 50 therein (FIG. 6) which confront like openings 52 and 54, respectively, in the front panel 12 (FIG. 1); the pair of circular openings 48 and 52 and the pair 50 and 54 are respectively positioned to confront the lens barrels 56 and 58 of the projectors 32 and 34 with which the apparatus is to be utilized.

The projectors 32 and 34 are preferably of the type which utilize a rectangular slide magazine for containing the slides to be shown thereby, such magazines normally being attached to the machine from the front thereof. A pair of such magazines for the projectors 32 and 34 are indicated at 60 and 62, respectively, and in order to facilitate the attachment thereof to their respective projectors and to accommodate overly long magazines, irregularly shaped, aligned pairs of openings 64, 66 and 68, 70 are provided in the panels 44 and 12, respectively, the pairs of openings being positioned to confront their respective magazines.

The mounting plate 44 has attached to the rear face, or projection machine side, thereof a pair of synchonous drive motors 72 and 74, each having a low speed output shaft 76 and 78, which for example may rotate at 10 revolutions per minute, and being equipped with an integral magnetic brake and clutch assembly. Mounted on the shaft 76 and 78 are identical circular masks 80 and 82, respectively, the drive motors being so positioned that the output shafts thereof both lie generally in a plane containing the centerlines of the two projector lens barrels 56 and 58. Both masks extend in front of their associated lens systems, and since both are identical only the construction and operation of the mask 80 will be described in detail.

Referring to FIGS. 6–9, the mask 80 is shown to comprise a circular disk having an integral continuous rim 84 thereon. The disk is divided into four quadrants, the first quadrant 86 being open or clear and its opposite, or the third, quadrant 88 being opaque. The second and fourth quadrants 90 and 92 contain confronting, opaque, tapered concentric arcs or teeth 94 and 96, respectively. The space between the teeth is clear or open, and the teeth are so graduated in profile that the masking of the lens system disposed behind the disk is varied linearly between zero and 100 percent as the quadrants 90 and 92 of the mask 80 are each rotated.

The mask 80 may be constructed by either utilizing a solid disk of opaque material from which the material in the open quadrant 86 and from between the teeth 94 and 96 has been removed, or by utilizing an initially clear disk of material which is made opaque in the areas occupied by the quadrant 88 and by the teeth 94 and 96. The disk 80 in the drawing is constructed by the former method, and in this instance a counterweight 98 is attached to the rim 84 opposite quadrant 88, whereby to dynamically balance the disk by compensating for the material removed to define the open mask areas.

Figure 9:
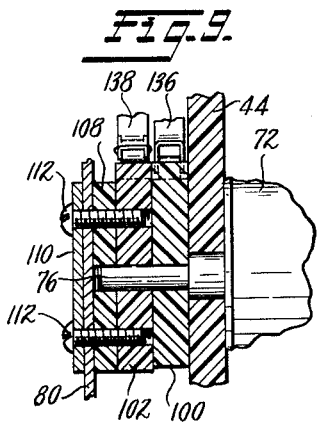
FIG. 9 is a section taken generally along line 9—9 in FIG. 8, and shows in detail the manner in which one of the masks and its associated cams are mounted.
Figure 8:
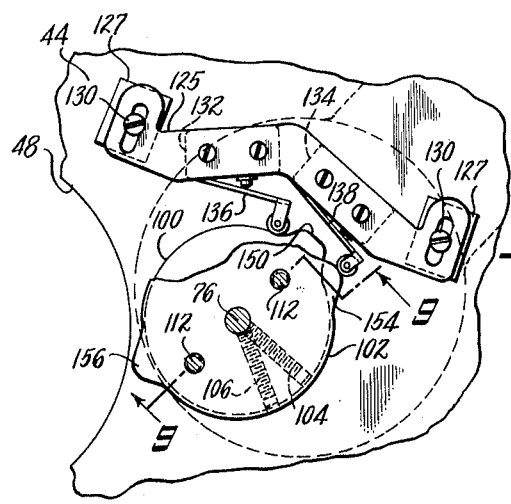
FIG. 8 is a view in elevation, taken along line 8—8 in FIG. 7, showing the arrangement of the slide advance and sequencing cams and their associated switches.

The manner in which the mask 80 is secured to shaft 76 is best illustrated in FIGS. 8 and 9. A pair of cams 100 and 102 having central bores therein are mounted on the shaft 76 and are secured thereto by set screws 104 and 106, respectively, said cams being described in greater detail hereinbelow. A spacer disk 108 having a central bore therein is also received on shaft 76, and the mask 80 is disposed between it and a retainer plate 110. A pair of screws 112 pass through aligned bores in the retainer plate 110, the mask 80 and the disk 108, and are received within threaded bores in the cam 102, thus securely mounting said mask 80 in position.

Figure 10:
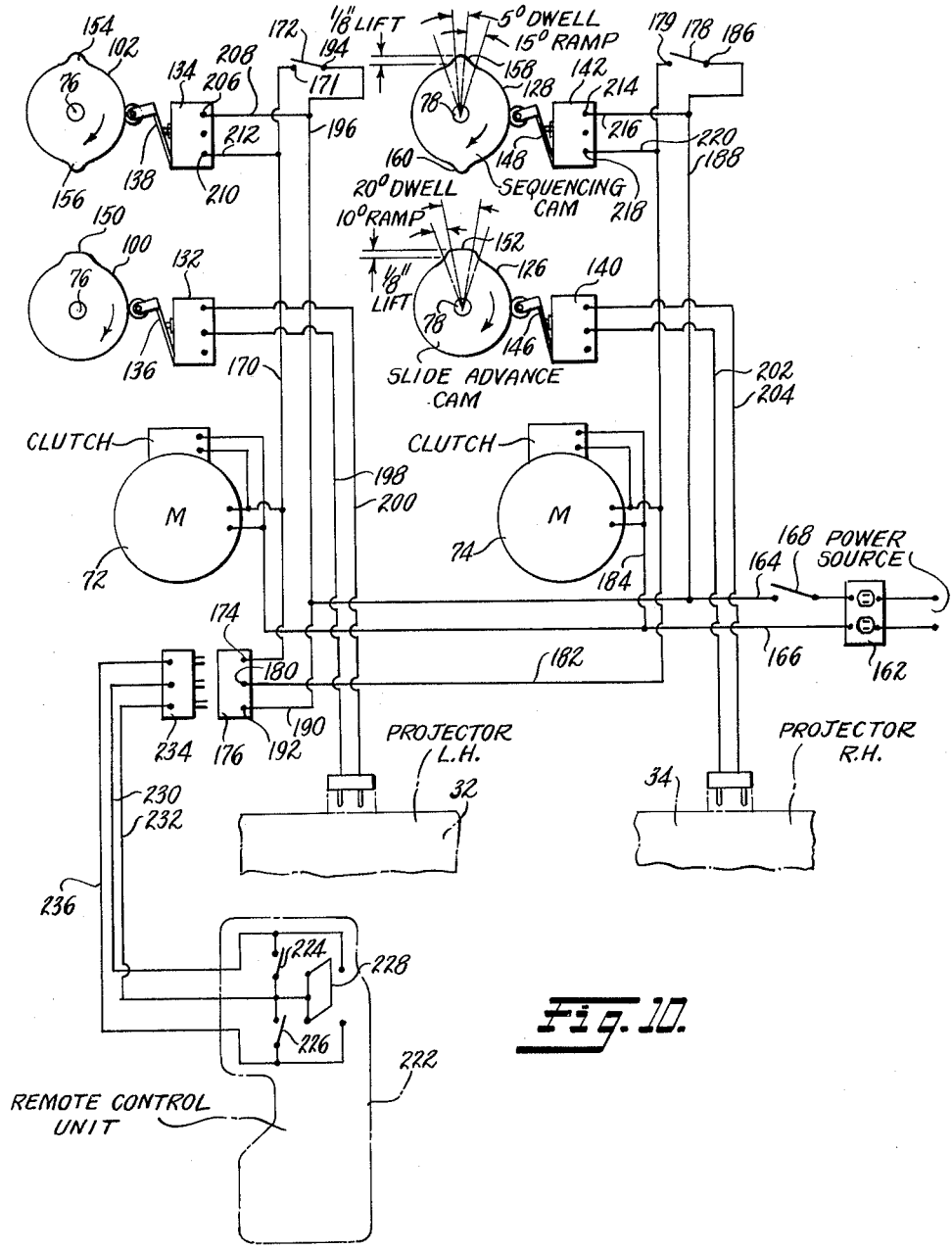
FIG. 10 is a schematic of the circuitry associated with the projection apparatus of the invention.

The mask 82 includes a rim 114 having a counterweight 116 thereon, an open first quadrant 118, a closed third quadrant 120, and opaque teeth 122 and 124 in the third and fourth quadrants thereof which are identical to the teeth 94 and 96. Said mask 82 is mounted on the shaft 78 in a manner identical to that in which the mask 80 is mounted, a pair of cams 126 and 128 also being positioned on said shaft (FIG. 10).

Both masks 80 and 82 may be operated independently, to fade out and in on a screen, an image projected by their associated projectors. Further, the two masks may be operated in tandem.

As is best shown in FIGS. 1 and 6, the two masks 80 and 82 both rotate clockwise and are intended to be so operated when it is desired to alternate the projection of slides between the two projectors 32 and 34 so that when the first, or open, quadrant 86 of the mask 80 is disposed in front of the lens barrel 56 the third, or opaque, quadrant 120 of the mask 82 is positioned over the lens barrel 58; moreover, the teeth 122 are then intended to move in front of the lens barrel 58 at exactly the same rate as the identical but opposite tapering teeth 94 pass in front of the lens barrel 56, whereby when both said projectors are projecting light upon a screen and both masks are rotating the brightness of the screen will remain substantially constant. For these desired results it is necessary that the output shafts 76 and 78 of the drive motors 72 and 74 rotate at substantially identical velocities and start and stop almost instantaneously, and that said motors be activated in the proper sequence. The identical operating speed for the motors is easily obtained by proper selection and matching thereof, and the nearly instantaneous starting and stopping of the output shafts can be obtained from the conventional magnetic brake and clutch assemblies with which the motors 72 and 74 are equipped. The manner in which the all-important sequencing of the drive motors is obtained will now be described.

Attached to the mounting panel 44 by an adjustable bracket 125, mounting blocks 127 and screws 130 are a pair of single pole, double throw microswitches 132 and 134, each having a pivoted, roller-tipped actuating arm 136 or 138, respectively, attached thereto. The actuator arm 136 of the switch 132 is positioned to ride on the cam 100, and the arm 138 is positioned to ride on the cam 102. An identical pair of switches 140 and 142 are secured to the mounting plate 44 by a bracket assembly 144 so that their respective actuator arms 146 and 148 ride on the cams 126 and 128, respectively (FIGS. 6 through 10).

The cams 100 and 126 are identical and they each have a single protuberance 150 and 152, respectively, thereon, the typical dimensions for said protuberances being indicated in FIG. 10 with respect to the protuberance 152. The cams 102 and 128 are also identical, and they each have a pair of diametrically opposed protuberances 154, 156, 158 and 160, respectively, thereon; the typical dimensions for the protuberances on the cams 102 and 128 are also indicated in FIG. 10, and it is seen therefrom that the dwell surfaces thereof are about 5 degrees in arc length, as compared to about 20 degrees of arc length for the protuberances 150 and 152. Each of the protuberances is of such a height that when the roller-equipped tip of its associated switch actuator arm passes thereover the switch will be depressed; for so long as the actuator arm rests on the protuberance the switch will remain depressed, and when the cam bearing the protuberance rotates sufficiently the actuator arm tip will ride off the protuberance and the switch will again return to its original condition.

The projectors 32 and 34 utilized with the apparatus of the invention are of the type having the capability of automatically advancing their magazine-loaded slides by a remote electrical switch. Manually operated projectors may be utilized, but in this instance an assistant must manually advance the slide at the proper time. The projector apparatus is equipped with circuitry divided into two sections, one for each projector. Common to both sections is a power source and power switch, a remote control cable receptacle, and an electrical power outlet receptacle to provide a power source for the two projectors. The circuitry for the apparatus is shown schematically in FIG. 10, reference to which is now made.

A double power outlet 162 is connected across a pair of leads 164 and 166 from the power source in FIG. 10, and power to the two projectors 32 and 34 is supplied thereby. A power switch 168 is disposed in the lead 164, and provides overall control for the apparatus. One of the terminals on the drive motor 72 and its associated magnetic clutch apparatus is connected to the power lead 166, and the other terminal on each of said elements is connected by a lead 170 to one terminal 171 of a single pole, single throw, momentary contact push button switch 172 and to an end terminal 174 of a remote control receptacle 176.

The switch 172 is mounted on the top panel 10 of the case 4, and is thus easily accessible to the operator. A second similar switch 178 is also mounted on said panel, and one of the terminals on each of the drive motor 74 and its attached magnetic clutch assembly is connected between one terminal 179 of said switch 178 and the middle terminal 180 of said remote control receptacle by a lead 182. The other terminal on the drive motor 74 and on its associated clutch are both connected with the power lead 166 by a lead 184, and the other terminal 186 of the switch 178 is connected to the source lead 164 by a lead 188. The source lead 164 is itself connected by a lead 190 to the other end terminal 192 of the receptacle 176, and to the other pole 194 of the switch 172 by a lead 196.

The switch 132 associated with the cam 100 is normally open and it closes to operate the slide advancing mechanism of the automatic slide projector 32 when it is depressed by the protuberance 150, and a pair of leads 198 and 200 therefor connect the appropriate terminals of said switch to said projector. The switch 140 is intended to perform the same function and to operate in the same manner as the switch 132, but for the projector 34; it is connected to the projector 34 by a pair of leads 202 and 204. Thus, when power is flowing to the projectors 32 and 34, and their respective switches 132 and 140 are depressed and closed, the slide advance mechanism of said projector will be activated and the transparencies then in said projectors will be exchanged for others, all in a manner well known to the art.

Th switches 134 and 142 are normally closed but arranged to be opened when depressed by their respective protuberances. One end terminal 206 of switch 134 is connected to lead 196, and thus to the power lead 164, the terminal 194 and the terminal 192 on the receptacle 176, by a lead 208; the other end terrminal 210 of said switch is connected to the lead 170 by a lead 212, and is thus connected with one terminal of both the motor 72 and its clutch assembly, to the terminal 171, and to the other end terminal 174 on receptacle 176. Similarly, one end terminal 214 on switch 142 is connected by a lead 216 to the lead 188, and thus to source lead 164 and the terminals 192 and 186; the other end terminal 218 of said switch is connected to the lead 182 by a lead 220, and thus to the motor and clutch 74 and to the terminals 179 and 180.

As has been stated, the two switches 134 and 142 remain closed except when their actuator arms are depressed by their associated protuberances. Thus, when the power switch 168 is closed the drive motors 72 and 74 will be activated and will rotate their respective masks and the cams 100, 102, 102 and 128. As the cams 126 and 128 rotate in FIG. 10, the protuberances 154 and 158 thereon will engage their respective switch actuator arms, opening the switches 134 and 142 and thus stopping the drive motors. If then either of the switches 172 or 178 is depressed its associated switch 134 or 142 will be momentarily shunted out, and the corresponding drive motor will be started; as the drive motor starts and the cam 102 or 128 rotates its associated switch is again closed, and the motor will continue to run until said cam has rotated through 180 degrees and the opposite protuberance again opens the switch. Thus, the masks 80 and 82 are automatically rotated through 180 degrees, or two quadrants, whenever the switches 172 and 178, respectively, are momentarily closed.

The drive motors 72 and 74 in the invention may also be operated from a suitable remote control unit, such a unit being indicated at 222 in FIG. 10. The unit 222 includes a pair of single pole, single throw, momentary contact switches 224 and 226 and a double pole, single throw, momentary contact switch 228. The switch 224 is connected across terminals 192 and 180 by a pair of leads 230 and 232 and a plug 234; it thus controls the drive motor 74 in the same manner as switch 178. Similarly, the switch 226 is connected by leads 232 and 236 across the terminals 174 and 192, and controls the drive motor 72. The double pole switch 228 is connected so that when it is closed it actuates both of said drive motors simultaneously, and thus simultaneously rotates both of said masks; this same effect may, of course, be obtained by simultaneously depressing both of the switches 172 and 178.

It is thus seen that the masks 80 and 82 may be either utilized separately, or both may be rotated simultaneously by simultaneously activating their respective drive motors. The manner in which the invention operates to produce the various effects obtainable therefrom will now be described.

If but one projector is to be utilized, the mask associated therewith may be employed to fade the image out and in and the projector may be operated automatically by the two cams associated with said mask. For purpose of illustration, assume that only the projector 32 is to be utilized. It is placed on the apparatus and is connected to the plug 162. The leads 198 and 200 are attached thereto and, if it is to be utilized, the remote control unit 222 is connected to the apparatus. After the slide magazine is in position the switch 168 is closed, and the projector begins to operate.

The sequencing protuberance 154 is positioned so that when it opens switch 134 the opaque quadrant of the mask 80 will have just covered lens barrel 56. The protuberance 150 on the slide advance cam 100 is, as is shown in FIG. 8, displaced a few degrees behind the protuberance 154, whereby the switch 132 is closed and the slide changing mechanism is actuated just before the switch 134 is opened; thus, the slide is changed while the barrel 56 is covered and the screen is dark. When it is desired to view the slide either the switch 172 or the switch 226 is momentarily closed, thus shunting across switch 134 and activating drive motor 72. The motor 72 rotates mask 80 through 180 degrees before the switch 134 is again opened by the protuberance 156; during this period of rotation the opaque quadrant 88 passes from in front of the barrel 56, the teeth 96 pass thereby and fade in the image on the screen, and the clear quardrant 86 becomes positioned in front of the lens system. The slide is then viewed for as long as desired.

When it is desired to again change the slide the switch 172 or 226 is again closed, and mask 80 again rotates through 180 degrees until the protuberance 154 again opens switch 134. During this period the image gradually decreases to zero brightness as the teeth 94 rotate in front of the lens, and as soon as the opaque quadrant 88 rotates into position and before switch 134 is opened the slide advancing switch 132 is closed by protuberance 150. The operating sequence or cycle is then completed, and can be repeated as often as is desired.

The cams 126 and 128 have the same relationships as have been described and as are shown in FIG. 8 for the cams 100 and 102, and thus the projector 34 and its mask 82 may be operated in a manner identical to that just described.

As has been mentioned hereinabove, the apparatus of the invention is particularly useful for practicing a novel method of obtaining image overlay effects. In this instance both projectors are initially focused on the same screen, and are adjusted until their projected images on said screen are in registry. While the projectors can be shifted about manually until such registry is obtained, the great effect on the screen caused by a small change of projector position at normal projecting distances makes this task difficult. Accordingly, the present invention includes an apparatus for finely adjusting image registry.

Referring to FIGS. 1–5, the projectors 32 and 34 are seen to rest upon the bottom panel 6 and the back panel 22. Each projector has feet 238 at its front and rear, upon which it rests. The rear feet 238 on the projector 32 rests on an image registry adjustment apparatus 240, best shown in FIGS. 3, 4 and 5.

The panel 22 has therein a shallow rectangular recess 242 extending about half way thereacross, a somewhat deeper but narrower rectangular recess 244, and a deep, arcuate recess 246. Secured to the panel within the recess 242 by screws 247 is a metallic plate 248 having a narrow rectangular slot 250 and a wide rectangular slot 252 therein, said slots being aligned and the slot 252 extending to the outer end of said plate. An anchor plate 254 is secured in the recess 242 at the end thereof by screws 256, and has attached thereto by screws 258 an anchor block 260 having a bore extending therethrough.

A rectangular sheet, or table, 262 is disposed upon plate 248 and anchor plate 254 within the recess 242, and is slidably held against the upper surface of the plate 248 by a strip 264 disposed within slot 250 and a retainer plate 266 disposed within recess 244, the strip 264 and the plate 266 being secured to table 262 by screws 268.

Secured to the sheet 262 by screws 270 and disposed within the recess 246 is a drive block 272 (FIG. 3) having a threaded bore therethrough. A shaft 274 having a threaded end in engagement with the threaded bore of block 272 extends outwardly through the bore in block 260, and terminates in a knurled knob 276; a compression spring 278 is positioned on the shaft 274 between the blocks 272 and 260 and function to urge said blocks apart.

The manner of setting up the apparatus for overlaying effects is as follows. The case 4 is first opened, and the projectors 32 and 34 are placed thereon. The back panel 22 and the bottom panel 6 of the case are furnished with fixed rubber feet 280 and 282, respectively, and the front edge of the bottom panel has mounted thereon conventional, adjustable in height legs 284 also terminating in feet 286. The projectors 32 and 34 are turned on and their image is adjusted vertically to project on the screen by manipulating said legs 284.

The projector 34 is then adjusted horizontally so that its image is properly projected on the screen. The projector 32, whose rear feet rest on sheet 262, is then manually manipulated horizontally until its image is nearly in registry with the first image. Then, by manipulating knob 276 the sheet 262 may be translated with considerable precision to bring the image of the projector 32 into precise registry with the image of the projector 34.

After the above adjustments in projector positions have been completed, it may be that the images of two vertical lines at the sides of the picture are not quite coincident although a vertical centerline may be in perfect registry. The cause of this is that rarely do two objective lens systems have absolutely identical focal lengths. This situation may be corrected in range by moving the projector 34 manually slightly closer to or farther away from the screen. It is understood that during this entire process the clear or open quadrants of the masks are disposed in front of the projectors.

Once the projectors are properly positioned the apparatus of the invention may be utilized for either real or virtual overlay effects. The former are obtained by first actuating the switch 178 or 224, for example, whereby to cause the projector 34 to project an image upon the screen. The other projector 32 may then be operated by depressing switch 172 or 226 to project overlay images over the first image, the brightness of each overlay image being faded in and out by the mask 80.

Virtual overlay effects are obtained in the following manner. One of the projectors, say 34, is actuated so that an image is projected on the screen therefrom. The mask 80 of the other projector is then rotated so that the opaque quadrant is disposed in front of the lens barrel 56. If, then, both switches 172 and 178 are depressed simultaneously, or the single switch 228 is depressed, both switches 134 and 142 will be shunted out and the two drive motors 72 and 74 will operate simultaneously. The masks 80 and 82 then both rotate at the same time, with the result that the image from projector 34 is faded out on the screen at the same time and at the same rate as the image from projector 32 is faded in. When the image from projector 34 leaves the screen, that projector will change slides and the process may then be repeated; thus, by alternating projectors a continuous overlay effect with uniform brightness is obtained. If a second slide contains an object that was not on the first slide, the dissolve change causes that object to "fade in" on the screen with the appearance of an overlay and without any other apparent change even though the entire image on the screen now comes from the second slide. Conversely, if the second slide lacks an object that was on the first slide, that object alone will fade off the screen as the change is made. Also, if an element appearing on both slides occupies a different position on each, the only apparent change will be the movement of that one element from one position to another on the screen. All of the above effects are intended to be included in the term "virtual overlay."

The technique described for creating virtual overlays may obviously also be utilized to show conventional transparencies. That is, the projectors may be actuated either simultaneously or with a slight time delay therebetween to project a series of slides in rapid sequence and with controlled brightness.

Obviously, many modifications and variations of the present invention are possible in the light of the above teachings. It is therefore to be understood that, within the scope of the appended claims, the invention may be practiced otherwise than as specifically described.

I claim:

1. Transparency projection apparatus accessory, comprising a case having a cover operable to define a support, means on said cover for releasably supporting a pair of projection machines, a pair of masks rotatably supported in said case in positions to rotate in front of a respective projecting lens system of each of said projectors, each mask including a first, clear portion, a second portion adjacent said first portion and uniformly varying over its length from zero to complete opaqueness, a third portion adjacent said second portion and being completely opaque, and a fourth portion disposed between said first and said third portions and uniformly varying over its length from complete to zero opaqueness, and means in said case for rotating said masks at uniform speed in front of said lens systems and in such timed relation as to uniformly but inversely vary the brightness of the images projected by said machines, between zero and full brightness.

2. Transparency projection apparatus as recited in claim 1, wherein said projection machines include apparatus for automatically changing transparencies in response to an electrical signal, and including switch means connected between a power source and said machine and supported by said case, and means associated with each mask and arranged to activate said switch means for furnishing a signal to said transparency changing apparatus to cause said machine to change transparencies during the period when an opaque portion of a mask is positioned in front of the lens system of either projection machine.

3. Transparency projection apparatus as recited in claim 1, wherein said means for uniformly rotating said masks includes an electric drive motor for each mask supported within said case, a mask being mounted on the output shaft of each motor, and including first switch means for automatically interrupting the flow of electricity to said drive motor when either said first, clear portion or said third, opaque portion of said mask is positioned in front of the respective lens system, and a second, manually operated switch means connected with said first switch means and said motor and arranged to shunt out said first switch means when activated to thereby start said motor.

4. Transparency projection apparatus, comprising a case, means on said case for supporting at least one projection machine, an electric drive motor supported on said case and having an output shaft, a mask secured on said shaft and positioned to rotate in front of the projecting lens system of said projector, said mask including a first, clear portion, a second portion adjacent said first portion and uniformly varying over its length from zero to complete opaqueness, a third portion adjacent said second portion and being completely opaque, and a fourth portion disposed between said first and said third portions and uniformly varying over its lentgh from complete to zero opaqueness, a cam secured on said shaft and having two diametrically opposed protuberances thereon, a first switch supported by said case and arranged to be operated by said protuberances, said first switch being connected between said motor and a source of electric power and when actuated by either of said protuberances opening to interrupt the transmission of power to said motor, said first switch and said cam being so disposed that said protuberances will actuate said switch when either said first portion or said third portion of said mask is positioned in front of said lens system, and a second switch connected with said first switch and said motor and arranged to shunt out said first switch when actuated to thereby start said motor while said first switch is being held open by either of said protuberances, said second and said fourth portions of said mask each comprising a plurality of opaque, tapered, concentric teeth each graduated in profile so that as the mask is rotated through the length of said portions the brightness of a projected image emanating from said machine will be linearally varied, the teeth of the second portion being arranged to confront the teeth of the fourth portion.

5. Transparency projection apparatus, comprising a case means on said case for supporting at least one projection machine, an electric drive motor supported on said case and having an output shaft, a mask secured on said shaft and positioned to rotate in front of the projecting lens system of said projector, said mask including a first, clear portion, a second portion adjacent said first portion and uniformly varying over its length from zero to complete opaqueness, a third portion adjacent said second portion and being completely opaque, and a fourth portion disposed between said first and said third portions and uniformly varying over its length from complete to zero opaqueness, a cam secured on said shaft and having two diametrically opposed protuberances thereon, a first switch supported by said case and arranged to be operated by said protuberances, said first switch being connected between said motor and a source of electric power and when actuated by either of said protuberances opening to interrupt the transmission of power to said motor, said first switch and said cam being so disposed that said protuberances will actuate said switch when either said first portion or said third portion of said mask is positioned in front of said lens system, and a second switch connected with said first switch and said motor and arranged to shunt out said first switch when actuated to thereby start said motor while said first switch is being held open by either of said protuberances, said projection machine includes apparatus for automatically changing transparencies in response to an electrical signal, and including a third switch connected between a power source and said machine, and a second cam on said output shaft and having a protuberance thereon positioned to engage and close said third switch to thereby transmit a signal to said transparency changing apparatus, said protuberance on said second cam being positioned so that said transparency changing apparatus will operate only when said third portion of said mask is positioned in front of said lens system.

6. Transparency projection apparatus, comprising a case, panel means on said case for supporting a first and a second projection machine, both of said machines being disposed to project images on the same screen, a first and a second electric drive motor supported on said case and each having an output shaft, a first mask secured on the output shaft of said first motor and positioned to rotate in front of the projecting lens system of said first projector, a second mask secured on the output shaft of said second motor and positioned to rotate in front of the projecting lens system of said second projector, said first and second masks being identical and each including a first, clear portion, a second portion adjacent said first portion and uniformly varying over its length from zero to complete opaqueness, a third portion adjacent said second portion and being completely opaque, and a fourth portion disposed between said first and said third portions and uniformly varying over its length from complete to zero opaqueness, a first cam secured on said first shaft and having two diametrically opposed protuberances thereon, a second cam secured on said second shaft and having two diametrically opposed protuberances thereon, a first switch supported by said case and arranged to be operated by said protuberances on said first cam, a second switch supported by said case and arranged to be operated by said protuberances on said second cam, said first and second switches being connected between a source of electric power and said first and second motors, respectively, and when actuated by either of their respective protuberances opening to interrupt the transmission of power to said motor, said first and second switches and said first and second cams being so disposed that said switches will be operated when either the first portion or the third portion of said masks are positioned in front of their respective lens systems, and switch means connected for shunting across either or both of said first and second switches, individually or simultaneously, to start either or both of said motors while said first and second switches are held open by said protuberances.

7. Transparency projection apparatus as recited in claim 6, wherein said panel includes means for precisely adjusting the horizontal position of one of said projectors relative to the other thereof to bring the images projected by said projectors into registry on said screen.

8. Transparency projection apparatus as recited in claim 7, wherein one of said projectors includes front and rear feet thereunder, and said adjusting means comprises a plate mounted for translational movement on said panel, and a threaded shaft connected to said plate and arranged to translate said panel when rotated, the rear feet of said one projector being disposed on said panel whereby translational movement of said panel will move said one projector horizontally.

9. Transparency projection apparatus as recited in claim 6, wherein said first and said second projection machines both include apparatus for automatically changing transparencies in response to an electrical signal, and including a third switch and a fourth switch supported by said case and connected between a power source and said first and second projectors, respectively, a third cam on said first output shaft and having a protuberance thereon positioned to engage and close said fourth switch to thereby transmit a signal to said transparency changing apparatus of said first projector, a fourth cam on said second output shaft and having a protuberance thereon positioned to engage and close said fourth switch to thereby transmit a signal to said transparency changing apparatus of said second projector, said protuberances on said third and fourth cams being positioned so that the transparency changing apparatus of both projectors will operate only when said third portions of said masks are positioned in front of their respective lens systems.

References Cited by the Examiner
UNITED STATES PATENTS

| | | | |
|---|---|---|---|
| 2,231,548 | 2/1941 | Rackett | 354—44 |
| 2,307,297 | 1/1943 | Phillimore | 352—91 |
| 2,336,781 | 12/1943 | Earle | 352—42 |
| 2,503,277 | 4/1950 | Krows | 352—153 X |
| 2,530,417 | 11/1950 | Young | 88—28 |
| 3,093,030 | 6/1963 | Carrillo | 88—28 |
| 3,161,109 | 12/1964 | Carrillo | 88—28 |

NORTON ANSHER, *Primary Examiner.*

WILLIAM MISIEK, *Examiner.*

V. A. SMITH, *Assistant Examiner.*